US012573114B2

(12) United States Patent
Hamilton

(10) Patent No.: US 12,573,114 B2
(45) Date of Patent: Mar. 10, 2026

(54) SELF-SUPERVISED DEEP NEURAL NETWORK RECONSTRUCTION FOR CARDIAC MAGNETIC RESONANCE FINGERPRINTING

(71) Applicant: REGENTS OF THE UNIVERSITY OF MICHIGAN, Ann Arbor, MI (US)

(72) Inventor: Jesse Hamilton, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 500 days.

(21) Appl. No.: 17/590,718

(22) Filed: Feb. 1, 2022

(65) Prior Publication Data

US 2023/0245354 A1     Aug. 3, 2023

(51) Int. Cl.
*G06T 11/00* (2006.01)
*G06N 3/045* (2023.01)
(Continued)

(52) U.S. Cl.
CPC ............ *G06T 11/005* (2013.01); *G06N 3/045* (2023.01); *G06T 3/4046* (2013.01); *G06V 10/74* (2022.01);
(Continued)

(58) Field of Classification Search
CPC . G06T 11/005; G06T 3/4046; G06T 2210/41; G06N 3/045; G06N 3/08;
(Continued)

(56) References Cited

U.S. PATENT DOCUMENTS

| 2017/0146623 A1* | 5/2017 | Cohen | ................ | G01R 33/5602 |
| 2018/0203081 A1* | 7/2018 | Cohen | ...................... | G06N 3/08 |

(Continued)

OTHER PUBLICATIONS

Jesse I. Hamilton, Nicole Seiberlich, "Machine Learning for Rapid Magnetic Resonance Fingerprinting Tissue Property Quantification," Proc. IEEE institute Electronics Electron Eng Jan. 2020; 108(1): 69-85. doi:10.1109/JPROC.2019.2936998 (Year: 2020).*

(Continued)

*Primary Examiner* — Ping Y Hsieh
*Assistant Examiner* — Heath E. Wells
(74) *Attorney, Agent, or Firm* — MARSHALL, GERSTEIN & BORUN LLP

(57)          ABSTRACT
A computing system for self-training of a magnetic resonance imaging (MRI) tissue property artificial neural network (ANN) includes a processor and an ANN training application including instructions that, when executed by the one or more processors, are configured to cause the processor to generate tissue property maps; generate MRI fingerprint images; generate reconstructed MRI k-space data; and compare the reconstructed MRI k-space data to acquired MRI k-space data. A computer-implemented method includes generating tissue property maps; generating MRI fingerprint images; generating reconstructed MRI k-space data; and comparing the reconstructed MRI k-space data to acquired MRI k-space data. A non-transitory computer-readable storage medium storing executable instructions that, when executed by a processor, cause a computer to generate tissue property maps; generate MRI fingerprint images; generate reconstructed MRI k-space data; and compare the reconstructed MRI k-space data to acquired MRI k-space data.

19 Claims, 12 Drawing Sheets
(3 of 12 Drawing Sheet(s) Filed in Color)

(51) Int. Cl.

| | |
|---|---|
| *G06T 3/4046* | (2024.01) |
| *G06V 10/74* | (2022.01) |
| *G06V 10/774* | (2022.01) |
| *G06V 10/776* | (2022.01) |
| *G06V 10/82* | (2022.01) |

(52) U.S. Cl.
CPC ........ *G06V 10/7747* (2022.01); *G06V 10/776* (2022.01); *G06V 10/82* (2022.01); *G06T 2210/41* (2013.01)

(58) Field of Classification Search
CPC .... G06N 3/084; G06V 10/74; G06V 10/7747; G06V 10/776; G06V 10/82; G06V 10/454; G06V 2201/03
USPC ......................................................... 382/131
See application file for complete search history.

(56) References Cited

U.S. PATENT DOCUMENTS

| | | | | |
|---|---|---|---|---|
| 2020/0005497 | A1* | 1/2020 | Arberet | G06T 11/006 |
| 2022/0196771 | A1* | 6/2022 | Zur | G01R 33/50 |
| 2022/0292641 | A1* | 9/2022 | Wang | G06T 5/60 |
| 2022/0370033 | A1* | 11/2022 | Klingensmith | A61B 34/10 |

OTHER PUBLICATIONS

Assländer et al., "Low rank alternating direction method of multipliers reconstruction for MR fingerprinting." Magn Reson Med. 2018;79(1):83-96.

Cao et al., "Development of fast deep learning quantification for magnetic resonance fingerprinting in vivo." Magn Reson Imaging. 2020;70:81-90.

Cohen et al., "MR fingerprinting Deep Reconstruction Network (DRONE)." Magn Reson Med. 2018;80(3):885-894.

Cordero-Grande et al., "Complex diffusion-weighted image estimation via matrix recovery under general noise models," NeuroImage. Neuroimage; 2019 [cited Dec. 1, 2020]. Available from: https://pubmed.ncbl.nlm.nih.gov/31226495/_ PMID: 31226495.

Fang et al., "Submillimeter MR fingerprinting using deep learning-based tissue quantification." Magn Reson Med. 2020;84(2):579-591.

Fessler et al., "Nonuniform fast Fourier transforms using min-max interpolation." IEEE Trans Signal Process. 2003;51(2):560-574.

Hamilton et al., "Machine Learning for Rapid Magnetic Resonance Fingerprinting Tissue Property Quantification." Proc IEEE. 2020;108(1):69-85.

Hamilton et al., "MR fingerprinting for rapid quantification of myocardial T1, T2, and proton spin density." Magn Reson Med. 2017;77(4):1446-1458.

Hamilton et al., "Simultaneous Mapping of T1 and T2 Using Cardiac Magnetic Resonance Fingerprinting in a Cohort of Healthy Subjects at 1.5T." J Magn Reson Imaging. 2020;52(4):1044-1052.

Hamilton et al., "Simultaneous multislice cardiac magnetic resonance fingerprinting using low rank reconstruction." NMR Biomed. 2019;32(2):e4041.

Hamilton, "Deep Image Prior Reconstruction for Cardiac MR Fingerprinting," Radiology, University of Michigan (2021).

Hargreaves,. "Variable-Density Spiral Design Functions." http://mrsrl.stanford.edu/~brian/vdspiral/. Published 2005. Accessed Jun. 1, 2017.

Jafari et al., "Deep neural network for water/fat separation: Supervised training, unsupervised training, and No. training." Magn Reson Med. 2021;85(4):2263-2277.

Jaubert et al., "Free-running cardiac magnetic resonance fingerprinting: Joint T1/T2 map and Cine imaging." Magn Reson Imaging. 2020;68:173-182.

Ji et al., "Cardiac cine magnetic resonance fingerprinting for combined ejection fraction, T1 and T2 quantification." NMR Biomed. 2020;33(8):e4323.

Ji et al., "Deep learning reconstruction for cardiac magnetic resonance fingerprinting T1 and T2 mapping." Magn Reson Med. 2021;85(4):2127-2135.

Ji et al., "Investigating and reducing the effects of confounding factors for robust T1 and T2 mapping with cardiac MR fingerprinting." Magn Reson Imaging. 2018;53:40-51.

Lempitsky et al., "Deep Image Prior. In: Proceedings of the IEEE Computer Society Conference on Computer Vision and Pattern Recognition." IEEE Computer Society; 2018:9446-9454.

Lin et al., "Denoising of multi b-value diffusion-weighted MR images using deep image prior." Phys Med Biol. 2020;65(10).

Liu et al., "Cardiac Magnetic Resonance Fingerprinting: Technical Overview and Initial Results", Published by Elsevier, vol. 11, No. 12, (2018).

Ma et al., "Magnetic resonance fingerprinting." Nature. 2013;495(7440):187-192.

Ma et al., "Slice profile and B1 corrections in 2D magnetic resonance fingerprinting. Magn Reson Med." 2017;78(5):1781-1789.

Marcenko et al., Distribution of Eigenvalues for Some Sets of Random Matrices. Math USSR-Sb. IOP Publishing; Apr. 30, 1967;1(4):457.

Muckley et al., "TorchKbNufft: A High-Level, Hardware-Agnostic Non-Uniform Fast Fourier Transform." In: ISMRM Data Sampling & Image Reconstruction Workshop. ; 2020.

Robson et al., Comprehensive quantification of signal-to-noise ratio and g-factor for image-based and k-space-based parallel imaging reconstructions. Magn Reson Med. Oct. 2008;60(4):895-907. PMCID: PMC2838249.

Veraart et al., Denoising of diffusion MRI using random matrix theory. NeuroImage. Nov. 15, 2016;142:394-406. PMCID: PMC5159209.

Walsh et al., "Adaptive reconstruction of phased array MR imagery." Magn Reson Med. 2000;43(5):682-690.

Wang et al., "Phase imaging with an untrained neural network." Light Sci Appl. 2020;9(1):2047-7538.

Winkelmann et al., "An optimal radial profile order based on the Golden Ratio for time-resolved MRI." IEEE Trans Med Imaging. 2007;26(1):68-76.

Yang et al., "Game of Learning Bloch Equation Simulations for MR Fingerprinting." In: Proc. 26th Annu. Meet. ISMRM. Paris, France; 2018:673.

Yang et al., "Low rank approximation methods for MR fingerprinting with large scale dictionaries." Magn Reson Med. 2017;79(4):2392-2400.

\* cited by examiner

300

INPUT LAYER                                                    OUTPUT LAYER

600

SELF-SUPERVISED DEEP NEURAL NETWORK RECONSTRUCTION FOR CARDIAC MAGNETIC RESONANCE FINGERPRINTING

FIELD OF THE DISCLOSURE

The present disclosure relates generally to methods and systems for cardiac magnetic resonance fingerprinting using deep image priors, and more particularly, reconstruction techniques for cardiac magnetic resonance fingerprinting using self-supervised neural networks to reconstruct tissue parameter maps.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In conventional deep learning magnetic resonance fingerprinting techniques, a neural network must be trained using many (e.g., hundreds or thousands or more) of in vivo datasets. In addition to requiring massive training data sets that are difficult and costly to acquire and store, it is difficult to acquire fully-sampled (noise and artifact-free) magnetic resonance fingerprinting data in the heart for training a deep learning model, as this would require extremely long scan times that are not feasible due to respiratory and cardiac motion. Further Furthermore, the performance of conventional deep learning techniques depends on the quality of the training data and may lack generalizability if certain features are underrepresented in the datasets used for training.

Further, a major limitation of magnetic resonance fingerprinting is that dictionary generation and pattern matching can be time-consuming and memory-intensive; these challenges are more pronounced for cardiac magnetic resonance fingerprinting because a new dictionary must be generated after every acquisition, as the subject's cardiac rhythm affects the sequence timings. Dictionary generation and pattern matching are also problematic for high-dimensional MRF applications that quantify many parameters (often in addition to T1 and T2), since computation time and memory usage scale exponentially with the number of parameters in the dictionary.

Supervised machine learning (e.g., supervised deep learning) has been proposed to address limitations of dictionary-based matching. For example, conventional techniques employ supervised learning, in which an artificial neural network is trained (i.e., optimized) using many instances (e.g., hundreds, thousands, or more) of training data. Such supervised artificial neural networks can be used to generate MRF dictionaries or to bypass the dictionary altogether by reconstructing parameter maps directly from the time series of MRF images. For MRF, the training data typically consist of pairs of "ground truth" parameter maps and a time series of under-sampled images.

The training data for training conventional supervised machine learning must often be acquired in human subjects, which has several disadvantages. First, long scan times on the order of several minutes are needed to collect fully-sampled reference images in MRF, which may be possible in stationary organs but not in the heart. Second, artificial neural networks trained using supervised learning may produce artifacts that are difficult to recognize, such as inaccurate parameter estimates, if certain image features are underrepresented in the training data. This scenario may also occur when a patient has abnormal tissue parameter values that lie outside the range of those observed in the training set. Third, it may be necessary to collect entirely new training data if any part of the acquisition is changed (e.g., the MRF flip angle series or the spatial resolution). Thus, improved techniques for performing cardiac magnetic resonance fingerprinting are needed.

SUMMARY OF THE INVENTION

In one aspect, a computing system for self-training of a magnetic resonance imaging (MRI) tissue property artificial neural network (ANN) includes one or more processors; an ANN training application including computing instructions configured to be executed by the one or more processors; a tissue property generation ANN, electronically accessible by the ANN training application; a trained magnetic resonance fingerprint generator ANN, electronically accessible by the ANN training application; and an MRI physics model, electronically accessible by the ANN training application; wherein the tissue property generation ANN: i) includes a plurality of weights initialized using a matrix random values, ii) is configured to analyze acquired MRI inputs, and iii) is configured to output quantitative tissue property maps corresponding to the acquired MRI inputs; wherein the trained magnetic resonance fingerprint generator ANN: i) is pre-trained using input simulated data, ii) is configured to analyze input tissue property maps, and iii) is configured to output time series of MRI fingerprint images corresponding to the input tissue property maps; and wherein the computing instructions of the ANN training application, when executed by the one or more processors, are configured to cause the one or more processors to: (a) generate, by providing acquired MRI k-space data to the tissue property generation ANN, a plurality of tissue property maps; (b) generate, by providing the plurality of tissue property maps to the trained magnetic resonance fingerprint generator ANN, a time series of MRI fingerprint images; (c) generate, by providing the time series of MRI fingerprint images to the MRI physics model, reconstructed MRI k-space data; and (d) compare the reconstructed MRI k-space data to the acquired MRI k-space data to minimize a self-consistency loss function.

In another aspect, a computer-implemented method for self-training of a magnetic resonance imaging (MRI) tissue property artificial neural network (ANN) includes (a) generating, by providing acquired MRI k-space data to a tissue property generation ANN, a plurality of tissue property maps; (b) generating, by providing the plurality of tissue property maps to a trained magnetic resonance fingerprint generator ANN, a time series of MRI fingerprint images; (c) generating, by providing the time series of MRI fingerprint images to an MRI physics model, reconstructed MRI k-space data; and (d) comparing the reconstructed MRI k-space data to the acquired MRI k-space data to minimize a self-consistency loss function.

In yet another aspect, a non-transitory computer-readable storage medium stores executable instructions that, when executed by a processor, cause a computer to: (a) generate, by providing acquired MRI k-space data to a tissue property generation ANN, a plurality of tissue property maps; (b) generate, by providing the plurality of tissue property maps to a trained magnetic resonance fingerprint generator ANN, a time series of MRI fingerprint images; (c) generate, by providing the time series of MRI fingerprint images to an MRI physics model, reconstructed MRI k-space data; and (d) compare the reconstructed MRI k-space data to the acquired MRI k-space data to minimize a self-consistency loss function.

BRIEF DESCRIPTION OF THE DRAWINGS

This patent or application file contains at least one drawing executed in color. Copies of this patent or patent application publication with color drawing(s) will be provided by the United States Patent and Trademark Office upon request and payment of the necessary fee.

For a more complete understanding of the disclosure, reference should be made to the following detailed description and accompanying drawing figures, in which like reference numerals identify like elements in the figures, and in which.

DETAILED DESCRIPTION

Figure 1:
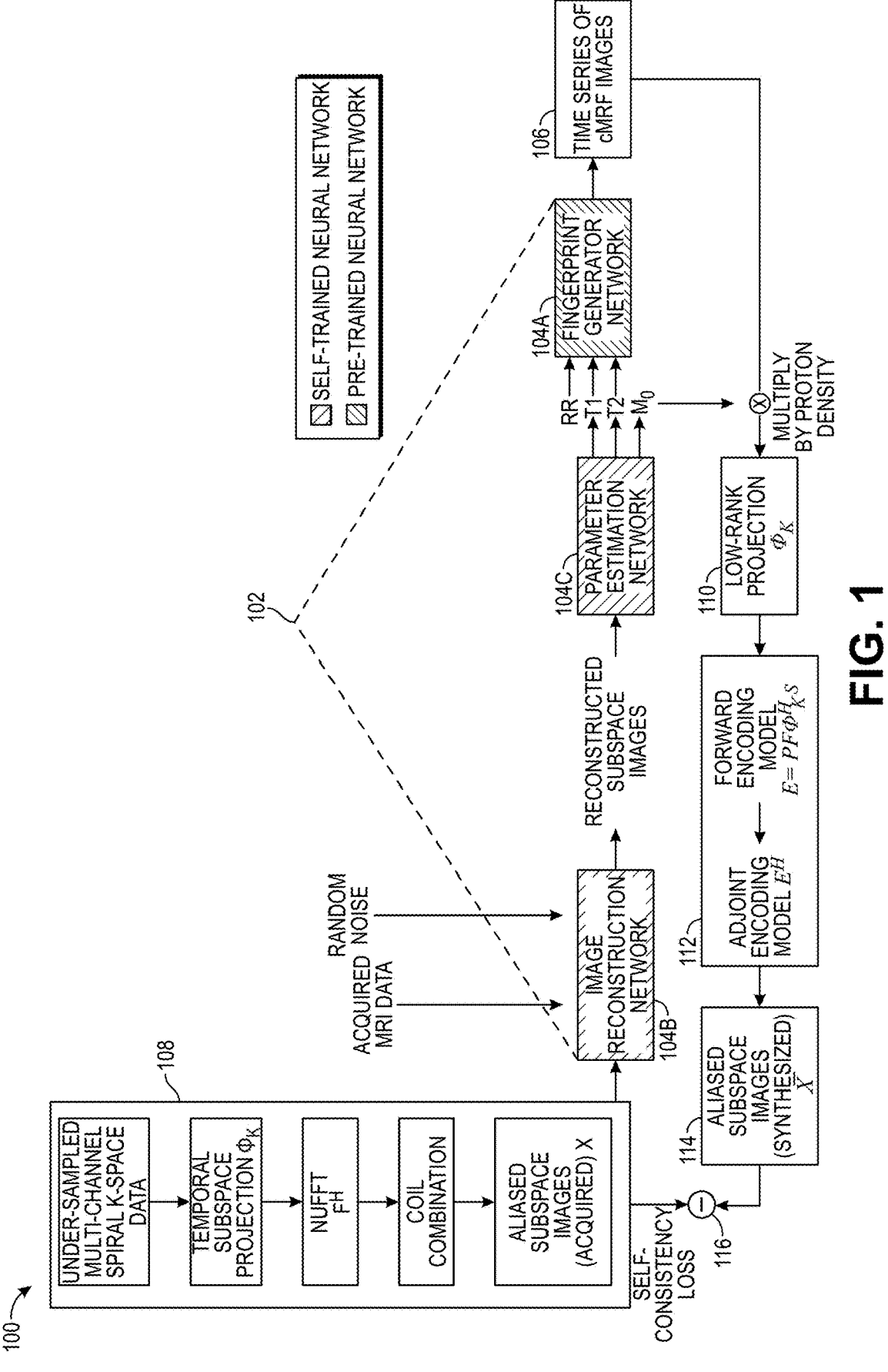
FIG. 1 depicts an example block flow diagram for training/or and operating one or more neural networks to perform cardiac MRF reconstruction, according to some aspects.

Magnetic resonance fingerprinting (MRF) is a quantitative framework for rapid and simultaneous parameter mapping that uses a time-varying magnetic resonance imaging (MRI) pulse sequence combined with dictionary-based pattern matching.

The present techniques include methods and systems for cardiac MRF using machine learning techniques (e.g., self-supervised neural networks) to reconstruct tissue parameter maps (e.g., T1 and T2 maps). In some aspects, the present techniques include a randomly-initialized untrained network that recovers parameter maps when given only under-sampled k-space measurements from one cardiac MRF scan, along with a subject's cardiac rhythm recorded by an electrocardiogram (ECG) during the scan. In some aspects, tissue maps may be reconstructed that are consistent with the MRF signal generation and MRI encoding model, while using the structure of an untrained convolutional network to regularize the solution.

The present techniques may include the use of one or more "untrained" artificial neural networks, also known as deep image priors. Such networks do not require a large and separate set of training data. Instead, an artificial neural network may be trained using a single dataset combined with a physical model of the image acquisition process. The artificial neural network weights may be randomly initialized, and then optimized to reconstruct an image that is consistent with the physical model. Specifically, in some aspects, the present techniques include constructing a self-supervised convolutional neural network (CNN) that reconstructs tissue parameter maps (e.g., T1 and T2) without the use of additional training data, and/or without the use of an MRF dictionary. This CNN may be randomly-initialized, in some aspects, and may recover tissue maps (e.g., T1, T2, and proton density (M0) maps) given only under-sampled k-space measurements from one scan and the subject's cardiac rhythm recorded by an electrocardiogram (ECG). In some aspects, parameter maps are reconstructed that are consistent with the MRF forward model, while using the structure of the untrained CNN to regularize the solution. In other words, the only possible solutions are parameter maps that can be represented by a CNN.

The present techniques advantageously improve upon conventional techniques in several ways. For example, unlike conventional artificial neural networks, the present techniques advantageously do not require separate training data. Further, the present techniques advantageously do not require a time consuming dictionary simulation. In particular, the present techniques may be especially useful for higher dimensional problems, including 3D MRF, motion-resolved cardiac cine MRF, and MRF applications with three or more tissue parameters, since this approach avoids the computation of large MRF dictionaries.

Overall, the present techniques provide improved under-sampling artifact and noise reduction, by using machine learning architectures (e.g., a deep neural network) that do not require additional in vivo training data (e.g., MRF scans). Additionally, because the present self-supervised networks may be fine-tuned specifically for each MRF dataset, generalizability issues of conventional techniques related to cases that are under-represented in training data are avoided.

Example Computer-Implemented Artificial Neural Network Architecture

FIG. 1 depicts an exemplary block flow diagram 100 for training/or and operating one or more neural networks to perform cardiac MRF reconstruction, according to some aspects. The diagram 100 includes acquiring cardiac MRF data. A plurality of cardiac MRF scan parameters are received during a 15-heartbeat (HB) breath-hold with ECG triggering in end diastole and a scan window (e.g., 255 ms). Variable flip angles between 4-25° and a constant TR/TE of 5.1/1.4 ms may be employed. A number (e.g., 750) of under-sampled images (TRs) are received. Preparation pulses may be applied before each scan window according to a schedule, which may repeat a number (e.g., three) of times. For example, a schedule may be HB1—inversion (TI at 21 ms), HB2—no preparation, HB3—T2 prep (30 ms), HB4—T2 prep (50 ms), HB5—T2 prep (80 ms). Data may be acquired using a 48-fold under-sampled spiral k-space trajectory with golden angle rotation for a matrix size of 192×192 and field-of-view 300 mm2, in some aspects. The acquired data may be input into a machine learning model (e.g., a tissue property generation artificial neural network).

The diagram 100 includes a reconstruction artificial neural network (ANN) component 102 that may include one or more ANN components. In the depicted aspect, the ANN component 102 includes a fingerprint generator network 104a, a low-rank image reconstruction network 104b and a parameter estimation network 104c. In some aspects, one of the networks 104 may be omitted, or combined with another of the networks 104. The image reconstruction network 104b and parameter estimation network 104c may be initially untrained and have random weights and biases. Whereas a conventional network may require large amounts of training data, these networks may be updated using a self-consistency loss function that only acts on the acquired under-sampled MRF data.

Example Fingerprint Generator Artificial Neural Network Training

Figure 4A:
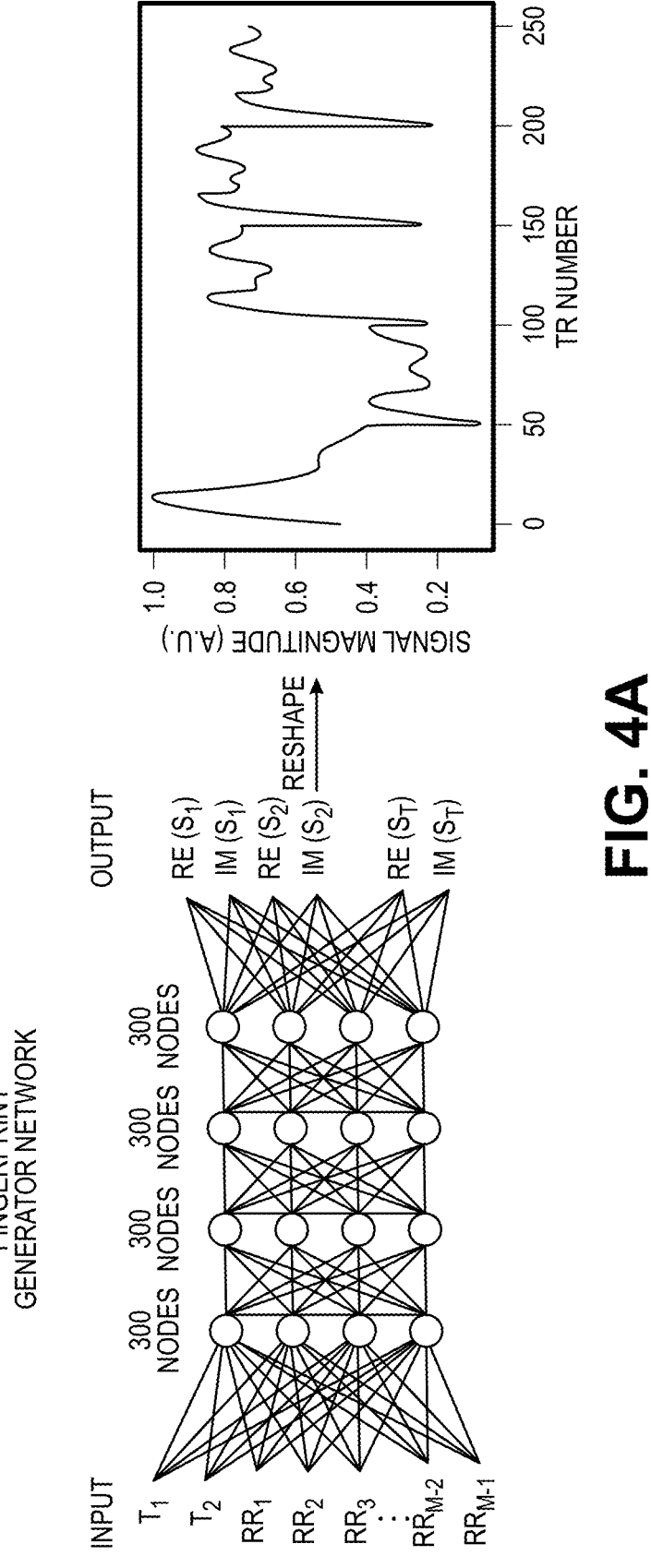
FIG. 4A depicts an example fingerprint generator network, according to some aspects.

The fingerprint generator network 104a may be a fully-connected structure having a number (e.g., four) of hidden layers and a number of nodes (e.g., 300) per layer, as shown in FIG. 4A.

Figure 4B:
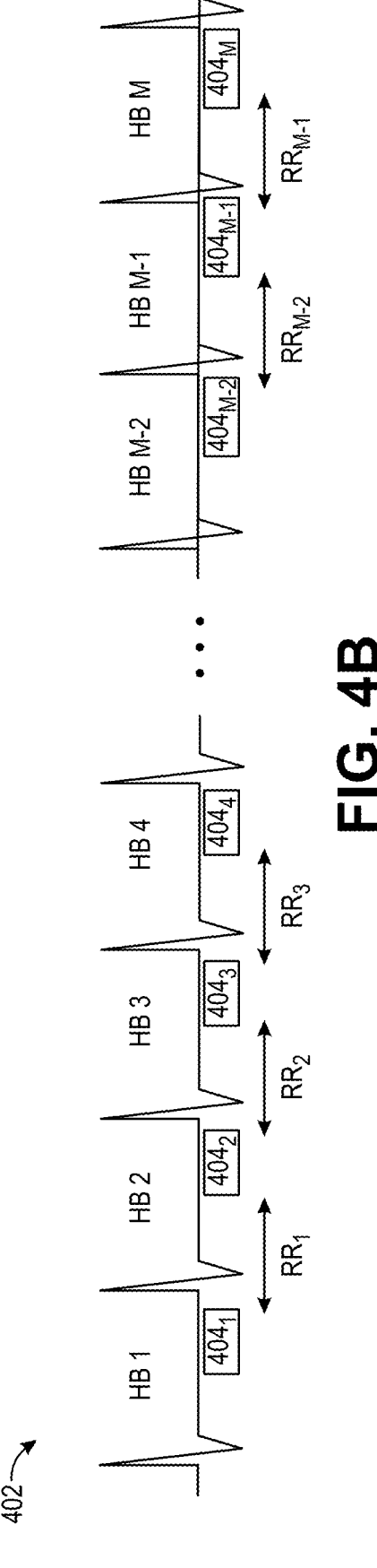
FIG. 4B depicts an example cardiac rhythm input to a fingerprint generator network, according to some aspects.

The fingerprint generator network 104a may be pre-trained, in some aspects, e.g., to output a 1-dimensional MRF signal time course 106 when given a pair of T1-T2 values and a cardiac rhythm. The cardiac rhythm may be represented as a vector of RR interval times (in milliseconds) obtained from an ECG, as shown in FIG. 4B. The present techniques may train the fingerprint generator network 104a one time, after which the same network can be used to reconstruct any MRF scan regardless of the subject's cardiac rhythm. The fingerprint generator network 104a may generate cardiac MRF signal time courses for arbitrary heart rhythms without needing to perform a Bloch equation simulation after every acquisition.

The fingerprint generator network 104a may be pre-trained using a Bloch equation simulation to generate a number (e.g., 1 million) of MRF signal time courses corresponding to a number (e.g., 20,000) of randomly generated cardiac rhythms. To create each cardiac rhythm, an average heart rate may be randomly selected between 40 to 120 beats per minute (bpm). Random Gaussian noise may be added to the RR interval times to introduce variability in the cardiac rhythms, and a noise standard deviation for each cardiac rhythm may be randomly selected as a fraction of the mean RR interval time. For example, the random selection may be chosen as follows: 0-10% of the mean RR (50% probability), 10-20% of the mean RR (30% probability), 20-50% of the mean RR (10% probability), or 50-100% of the mean RR (10% probability). Each heartbeat may be simulated with a 1% probability of a missed ECG trigger, modeled by doubling the RR interval time. The parameter values may be randomly selected, e.g., with 80% of T1 values between 50-2000 ms and 20% between 2000-3000 ms, and 60% of T2 values between 6-100 ms, 30% between 100-200 ms, and 10% between 200-300 ms. A number (e.g., fifty) of T1-T2 pairs may be selected for each of the cardiac rhythms. Corrections for slice profile and preparation pulse efficiency may be included in the training data.

Figure 4C:
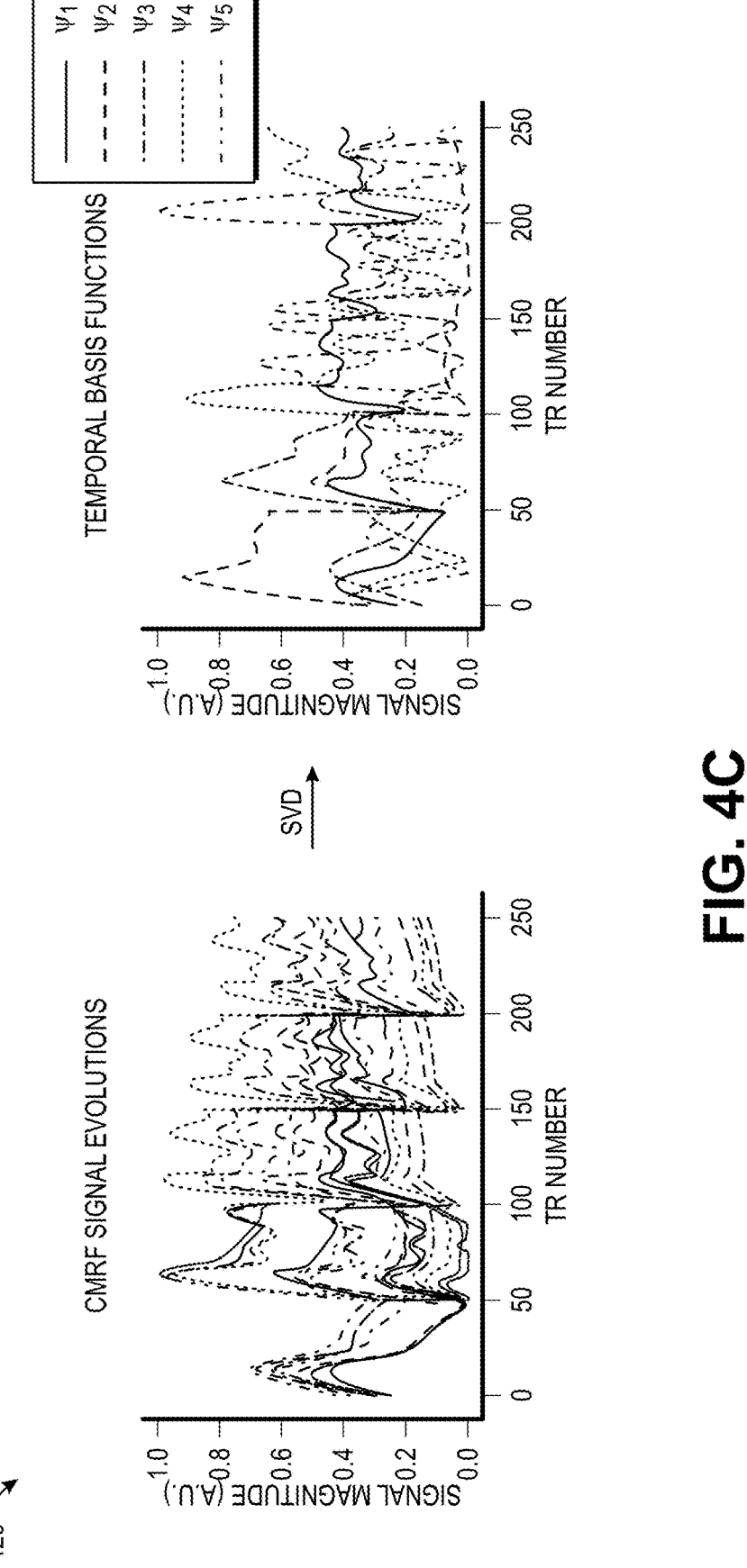
FIG. 4C depicts compressing MRF data, according to some aspects of the present techniques.

A low-dimensional temporal subspace for compressing the MRF data may be computed, as depicted in FIG. 4C. Rather than using the Bloch equations to simulate a dictionary, which can be time consuming, the fingerprint generator network 104a may rapidly output MRF signals for a number (e.g., approximately 10,000) of T1-T2 combinations (e.g., for T1 between 50-3000 ms and T2 between 6-300 ms). Advantageously, this step takes very little time (e.g., 0.2 seconds or less), as compared to orders of magnitude more time (e.g., 2-3 minutes) when Bloch equations are used. The signals may be organized into a matrix of size T×P, where Tis the number of TRs and P is the number of signals. The singular value decomposition (SVD) and rank-K truncation of the left singular matrix ($\Phi_K$) (i.e., the temporal subspace, wherein $\Phi_K$=span$\{\psi_1, \psi_2, \ldots, \psi_K\}$) may be computed.

At block 108, the under-sampled spiral MRF k-space data may be projected onto the temporal subspace and gridded to the image domain using the non-uniform fast Fourier Transform (NUFFT). Coil sensitivity maps are estimated from the first singular value (K=1) images using the Walsh method. The individual coil images may be combined by multiplication with the complex conjugate of the coil sensitivity maps and summing over the coil dimension. The resulting images, i.e., aliased subspace images (acquired) may have size N×N×K, where N is the matrix size, wherein the last dimension is an MRF contrast dimension.

Example Image Reconstruction Artificial Neural Network

Figure 2A:
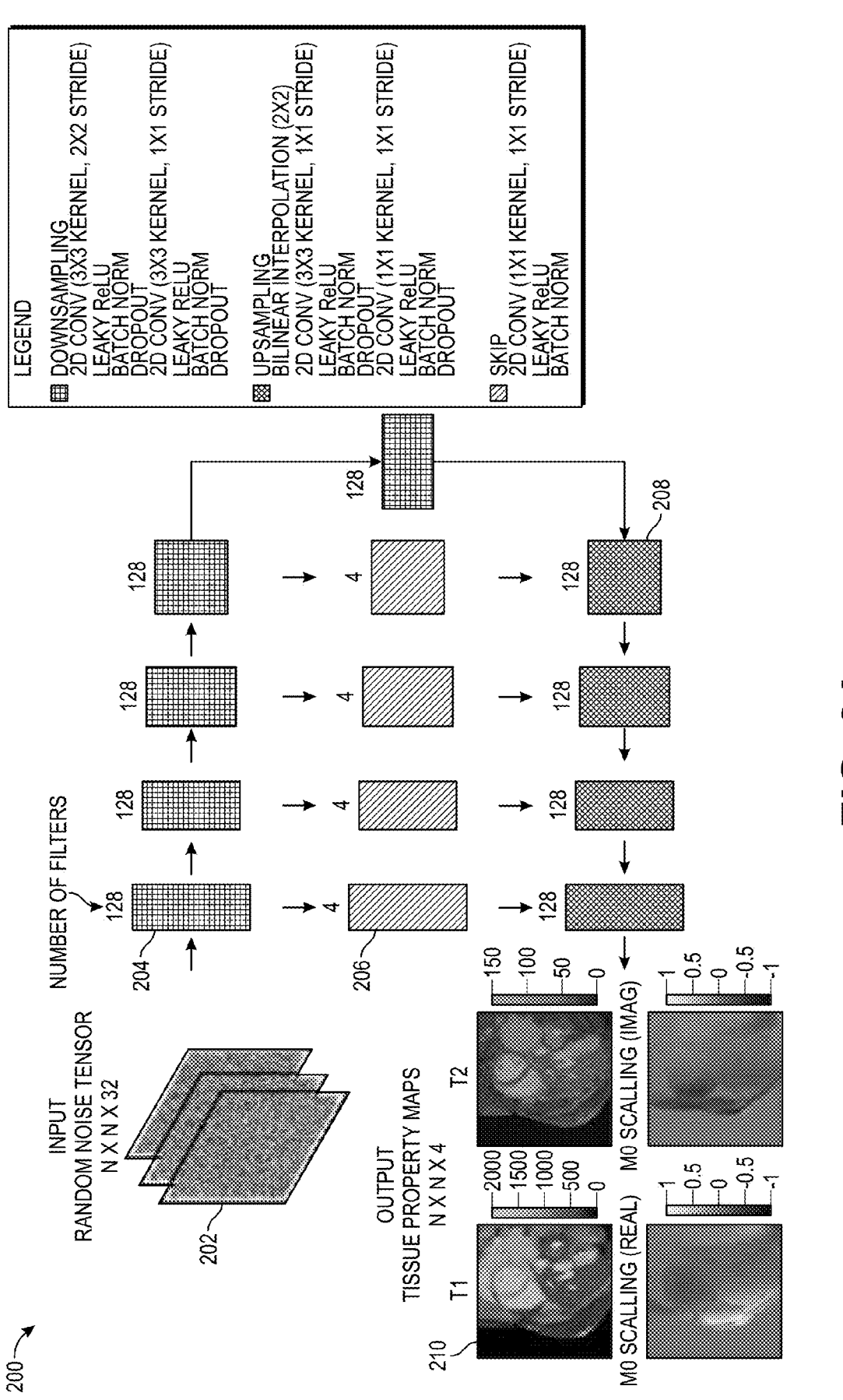
FIG. 2A depicts an example architecture for a U-net, according to some aspects.
Figure 2B:
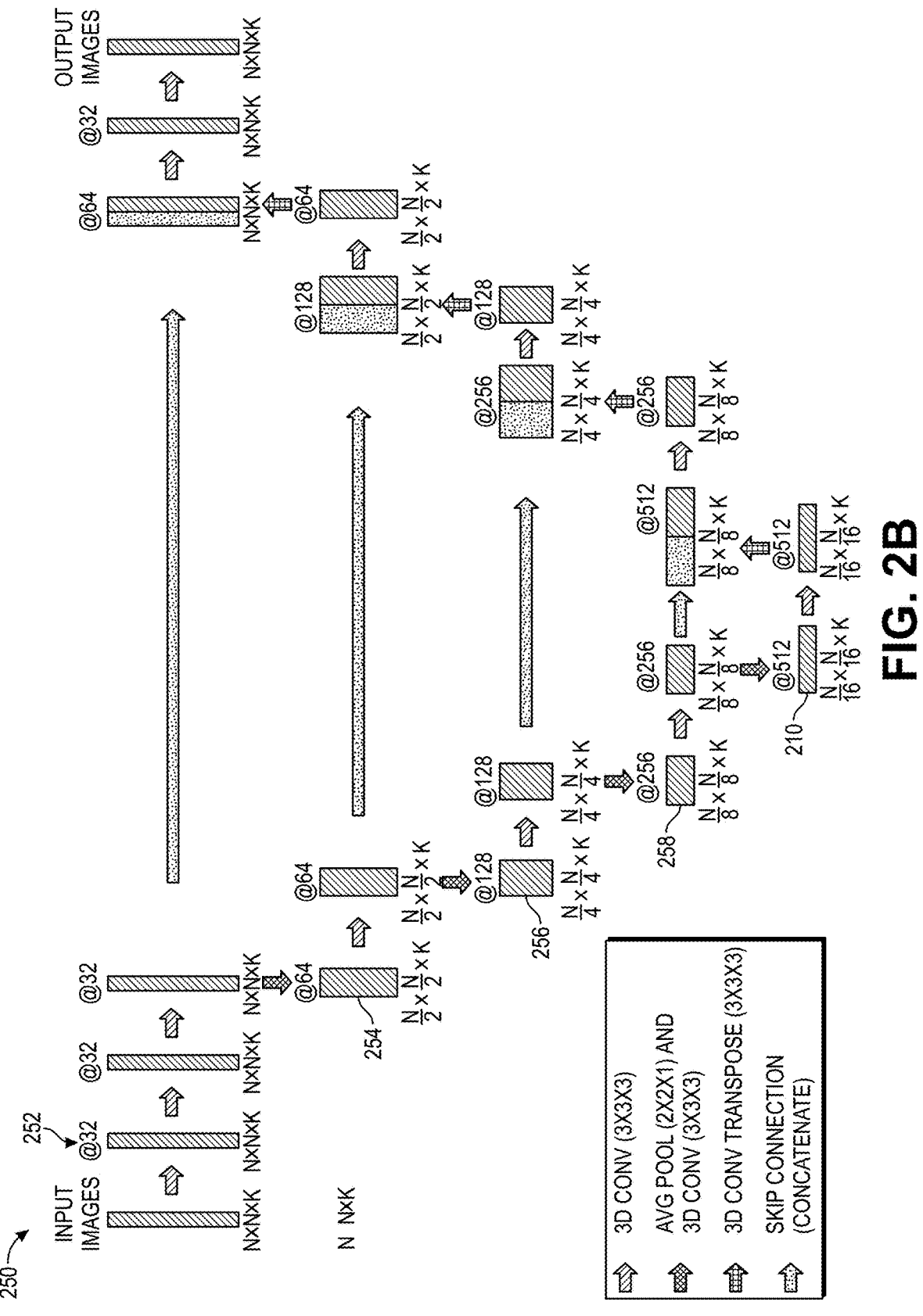
FIG. 2B depicts an example architecture for an image reconstruction network, according to some aspects.

The aliased subspace images may be input to the low-rank image reconstruction artificial neural network 104b. FIG. 2B depicts the image reconstruction artificial neural network 104b in further detail. In some embodiments, as depicted in FIG. 2A, a U-net architecture is used that performs complex convolutions with 3D kernels, which exploits correlations among the spatial and MRF contrast dimensions to remove noise and under-sampling artifacts. The output of the image reconstruction artificial neural network 104b, i.e., reconstructed subspace images, may have size N×N×K and may be input to the parameter estimation network 104c.

Example Parameter Estimation Artificial Neural Network

The reconstructed subspace images output by the image reconstruction network 104b may be input to the parameter estimation artificial neural network 104c. The network 104c is depicted in further detail in FIG. 3. In some aspects, the parameter estimation network 104c may include a fully-connected architecture that operates at each pixel location independently. The input to the parameter estimation network 104c may be a complex-valued signal in the temporal subspace from one pixel location, and the outputs of the parameter estimation network 104c may be the T1, T2, and effective M0 (both real and imaginary parts) values, as shown in FIG. 1B. The term "effective M0" is used to indicate that this quantity is a combination of the proton density and other factors (e.g., coil sensitivity bias). The parameter estimation network 104c improves upon conventional MRF techniques that use pattern matching, for example, because the parameter estimation network 104c does not require an exhaustive search through a dictionary, and the parameter estimates are continuous rather than discrete values.

The T1 and T2 maps and cardiac RR interval times output by the parameter estimation network 104c may be input to the fingerprint generator network 104a to yield MRF signal time courses 106. The signal time courses may be multiplied pixel wise by the effective M0 maps to produce a time series of synthetic MRF images (block 110). In a conventional iterative reconstruction, this step could be performed using a dictionary to replace each pixel in the parameter maps with an MRF signal time course, which would require an exhaustive search through the dictionary and be limited to discrete T1-T2 values. In contrast, the neural network approach is fast and is not limited to discrete parameter values. The synthetic images may be passed through a forward model of the MRI data acquisition process, including multiplication with the coil sensitivity maps and spatial encoding using the under-sampled spiral k-space trajectory (block 112). Finally, the resulting under-sampled images may be projected back to the temporal subspace and coil-combined (block 114), resulting in synthesized subspace images.

The synthesized subspace images may be compared with the originally acquired subspace images from block 108 using a mean absolute error ($l_1$) loss function (block 116), to ensure that the network-reconstructed data are consistent with both the acquired data and the MRF forward model. It will be appreciated by those of ordinary skill in the art that other suitable loss functions may be used, including mean squared error between the reconstructed (estimated) and acquired (raw) MRF data in k-space. Further, those of ordinary skill in the art will appreciate that this loss may be calculated by taking the difference between the originally acquired and synthesized k-space data. However, network training may converge faster when loss is calculated in the image domain.

In operation, the under-sampled spiral k-space data may be projected onto the low dimensional temporal subspace ($\Phi_K$). Next, the k-space data are gridded using the NUFFT, and coil combination is performed to yield the aliased subspace images (which have size N×N×K, where N is the matrix size and K is the rank of the temporal subspace). The aliased subspace images are passed through the image reconstruction network 104b (e.g., a U-net) with 3D complex convolution filters to remove noise and aliasing artifacts. Next, the reconstructed subspace images are input to the parameter estimation network 104c (e.g., a fully-connected network) that estimates the T1, T2, and effective M0 maps. The T1 and T2 maps, along with the cardiac RR intervals recorded by an ECG, are input to the fingerprint generator network (e.g., another fully-connected network) to produce a time series of synthetic cardiac MRF images. These images are multiplied pixel wise by the effective M0 maps and the MRI forward encoding model is simulated, including multiplication by coil sensitivity maps (S), projection from the temporal subspace to the time domain ($\Phi_K^H$), transformation to spiral k-space using the NUFFT (F), and k-space under-sampling (P). The fingerprint generator network 104a may be pre-trained separately as discussed. As discussed, the image reconstruction network 104b and the parameter estimation network 104c may be initially untrained, and may be trained using a self-consistency loss function that iteratively minimizes the mean absolute error between the originally acquired and synthesized subspace images.

The foregoing training may be repeated for a number of iterations (e.g., 200 epochs) using an algorithm (e.g., gradient descent) to update respective parameters (e.g., respective weights) of the image reconstruction network 104b and parameter estimation network 104c. A suitable optimizer (e.g., Adam) may be used. The learning rate was 0.001 for the first 100 epochs and 0.0002 for the last 100 epochs. Framework tools such as TensorFlow, Keras, etc. may be used to implement neural network computations, in some aspects.

Example U-Net Architecture

FIG. 2A depicts an exemplary architecture for a U-net 200, according to some aspects. The U-net 200 may be randomly initialized, and may be a self-supervised trained network. For example, the network may be trained on a single under-sampled MRF dataset to output T1, T2 and M0 maps, as shown in FIG. 1. On each epoch of training, the maps may be used to calculate the forward encoding model including a pre-trained artificial neural network to output signal evolutions from the maps. Loss may be computed in k-space. As shown, the U-net 200 may be fully connected, and may comprise the image reconstruction network 104b and the parameter estimation network 104c of FIG. 1, in some aspects. The U-net may receive an input 202 that may be a random noise tensor of size N×N×32, in some aspects. The U-net may comprise a plurality of down-sampling layers 204, a plurality of skip layers 206, and a plurality of up-sampling layers 208. The U-net may output a plurality of tissue property maps 210 including T1 and T2 maps, and both real and imaginary M0 maps.

Example Image Reconstruction Network

FIG. 2B depicts an exemplary architecture for an image reconstruction network 250, according to some aspects. The image reconstruction network 250 may correspond to the image reconstruction network 104b of FIG. 1, in some aspects. In some aspects, the image reconstruction network 250 may include removing noise and antialiasing artifacts from subspace input images using a U-net.

The image reconstruction network 250 may include encoding-decoding paths with 3D complex convolution kernels that exploit correlations among spatial and MRF contrast dimensions. In the depicted example, the number of convolution kernels in each layer is indicated by the @ symbol. Some layers may include skip layers, that provide paths to non-sequential layers, followed by concatenation. Down-sampling in the image reconstruction network 250 may be performed using 2×2 average pooling along the spatial dimensions only. Up-sampling in the image reconstruction network 250 may be performed using transposed 3D convolutions.

Example Parameter Estimation Artificial Neural Network

Figure 3:
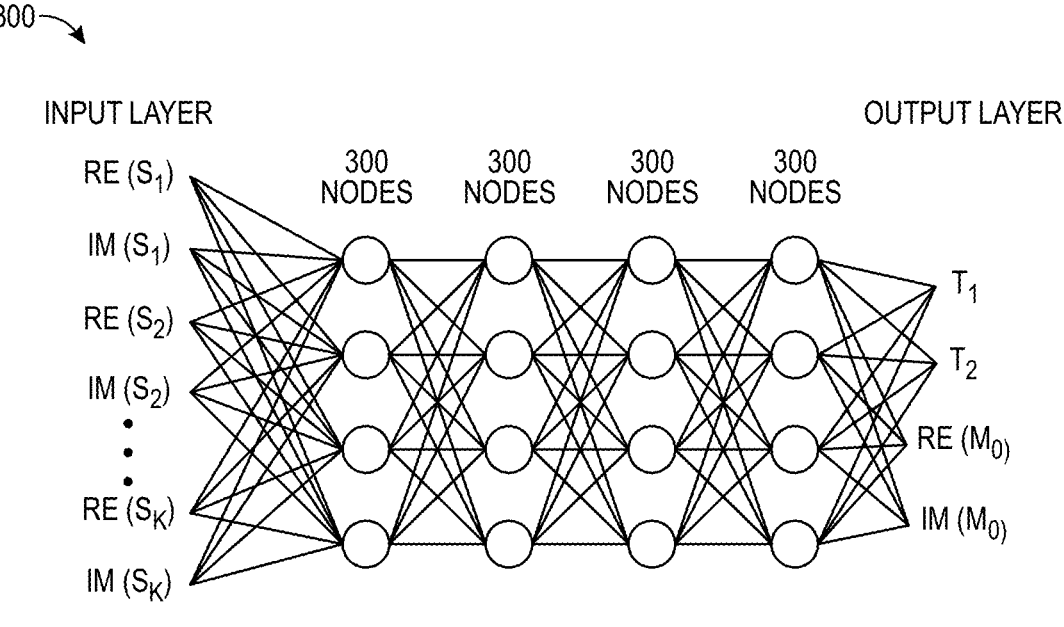
FIG. 3 depicts an example architecture for a parameter estimation network, according to some aspects.

FIG. 3 depicts an exemplary architecture for a parameter estimation network 300, according to some aspects. The parameter estimation network 300 may correspond to the parameter estimation network 104c of FIG. 1, in some aspects. The parameter estimation network 300 may be a fully-connected network used to estimate parameter maps from low-rank images output by the U-net of the image reconstruction network 104b, in some aspects. The input signal may be 1-dimensional with length 2", for example, corresponding to the real and imaginary parts of the K singular value coefficients at every pixel location. The parameter estimation network 300 may have a number (e.g., 4) of hidden layers and a number (e.g., 300) of nodes. The parameter estimation network 300 may output four outputs for T1, T2, and the real and imaginary parts of the effective M0.

Example Temporal Subspace Computation Aspects

FIG. 4A depicts an exemplary fingerprint generator network 400, according to some aspects. The fingerprint generator network 400 may correspond to the fingerprint generator network 104a of FIG. 1, for example. The fingerprint generator network 400 may be a fully-connected network that takes as inputs a pair of T1-T2 values, along with the subject's cardiac rhythm (the RR interval times recorded during the scan, as shown in FIG. 4B). The fingerprint generator network 400 may output a real part and an imaginary part of a complex-valued MRF signal at each of the T time points (TRs) in the scan.

FIG. 4B depicts an exemplary cardiac rhythm 402 (i.e., RR interval times) input to the fingerprint generator network 400, according to some aspects. The cardiac rhythm 402 may comprise a number of RR, from $RR_1$ to $RR_{M-1}$, where M is the total number of heartbeats in the MRF scan. The RR interval may be defined as a window of time that elapses from the end of one shaded ECG acquisition window 404 to the beginning of the next (e.g., from window $404_{M-2}$ to $404_{M-1}$).

Example Performance Analysis

Testing of the present techniques has been performed, for example, in cardiac MRF datasets acquired in five healthy subjects on a 1.5 T MRI scanner (Siemens Aera), including scans acquired during a 15-heartbeat breath hold with a 255 ms diastolic acquisition window, yielding 750 under-sampled images. The self-supervised network of FIG. 1 was compared with two dictionary-based reconstructions: conventional NUFFT gridding followed by dictionary matching, and an iterative low-rank reconstruction with $l_1$-wavelet regularization (solved using conjugate gradient descent, 15 iterations, rank of temporal subspace K=5) followed by dictionary matching. For the dictionary-based reconstructions, a scan-specific dictionary with 18,000 T1 and T2 entries was simulated using the Bloch equations. Regions-of-interest were manually drawn in the left ventricular septum and used to calculate the mean and standard deviation of T1 and T2.

Figure 5A:
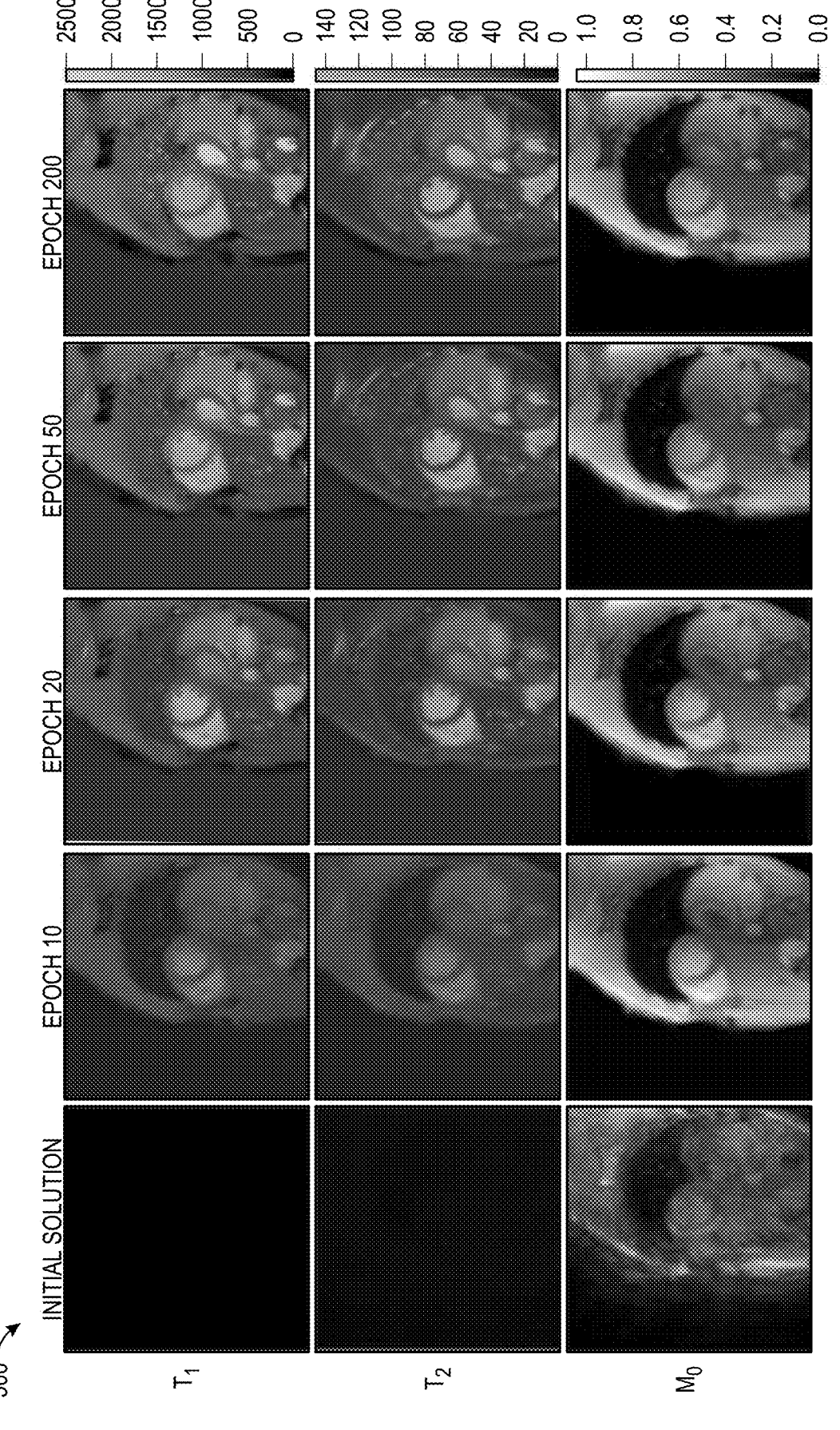
FIG. 5A depicts parameter maps from the self-supervised network after training for different numbers of epochs, according to some aspects.

FIG. 5A depicts exemplary parameter maps 500 from the self-supervised network after training for different numbers of epochs. Anatomical features become visible quickly (after around 10 epochs in this example), and subtle errors in the parameter estimates are corrected as training progresses.

Figure 5B:
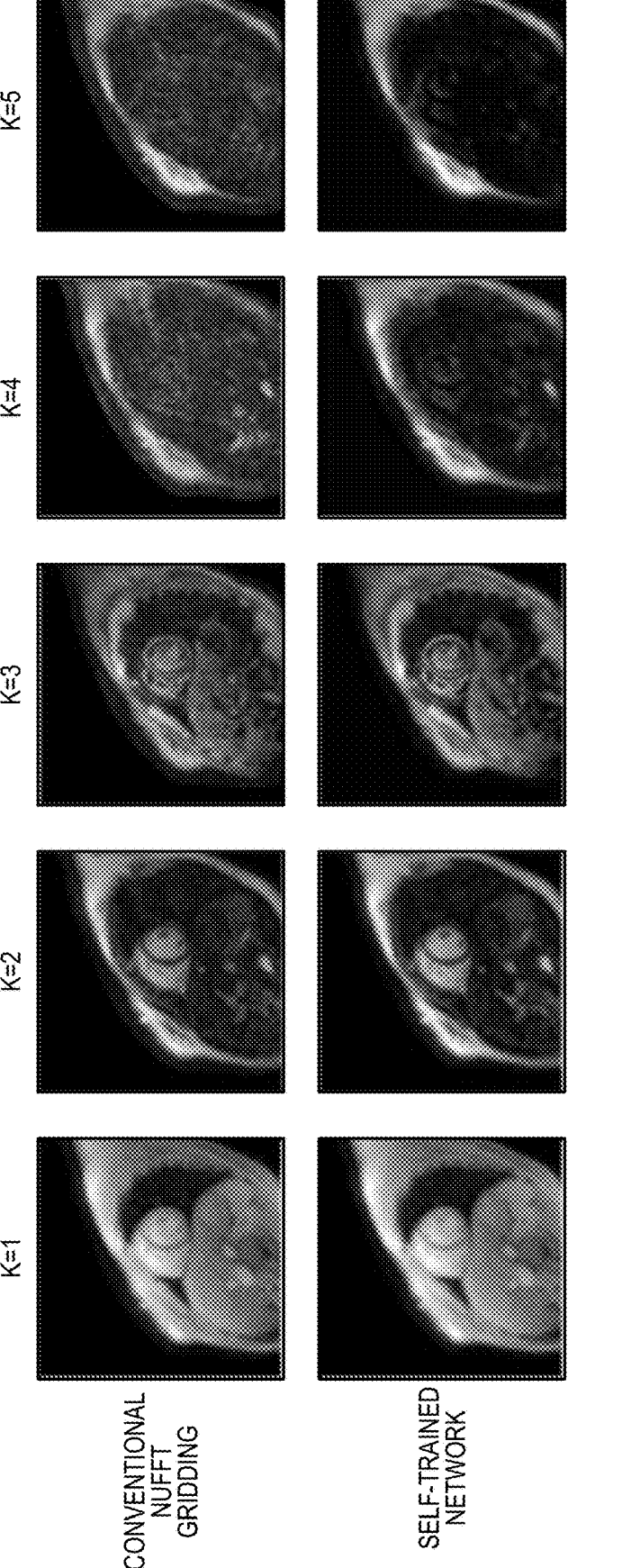
FIG. 5B depicts example subspace images output by an image reconstruction network, according to some aspects.

FIG. 5B depicts exemplary subspace images 510 output by the image reconstruction network 104b, for example. Compared to a conventional gridding reconstruction, the image reconstruction network 104b network removes noise while preserving high-resolution details.

Figure 5C:
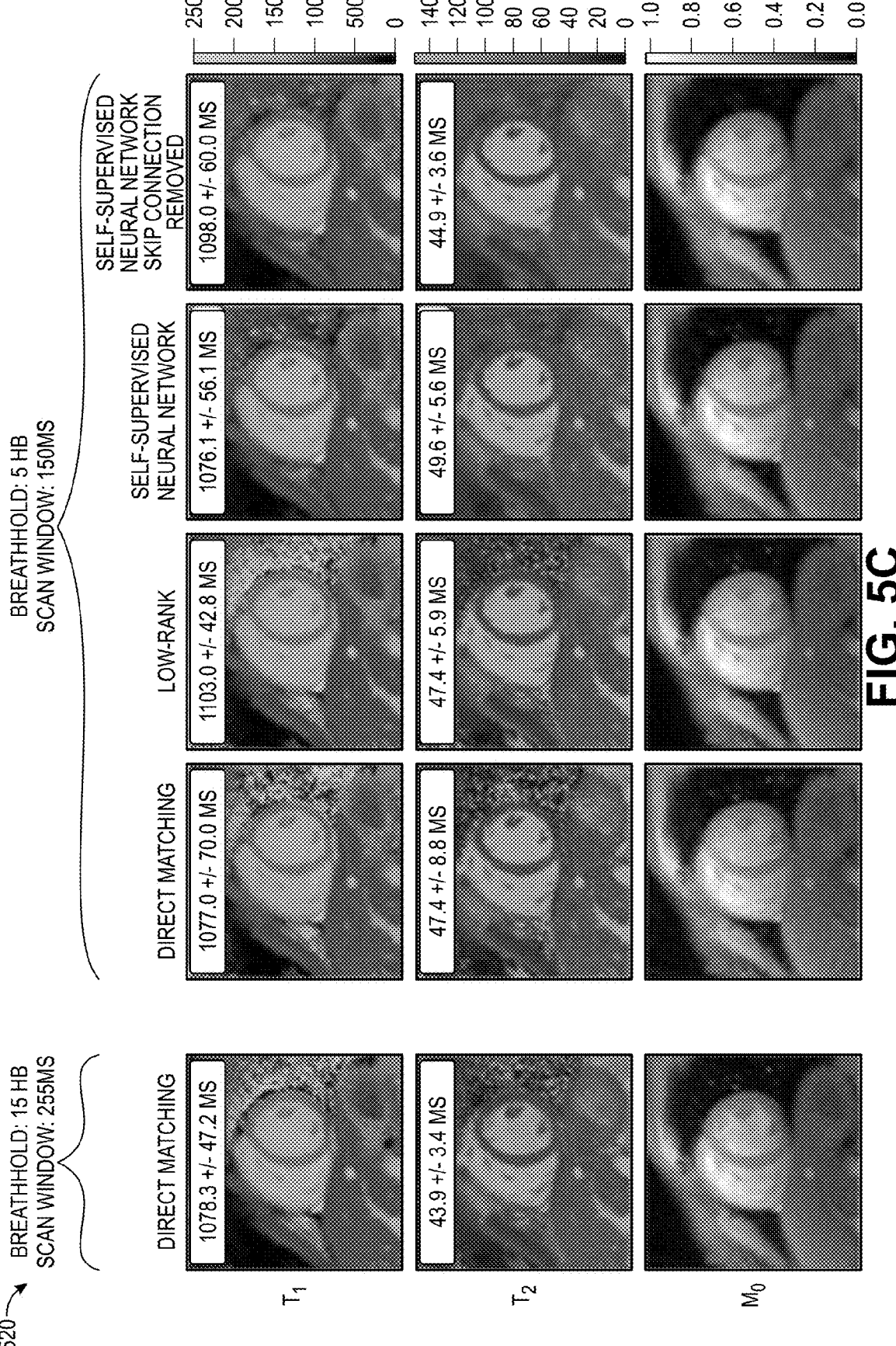
FIG. 5C depicts example parameter maps reconstructed using self-supervised network techniques, according to some aspects.

FIG. 5C depicts exemplary parameter maps 520 reconstructed using the present self-supervised network techniques and using dictionary-based reconstructions. Good visual agreement is observed among all the methods, and the self-supervised network preserves high-resolution details such as the papillary muscles and small vessels in the liver.

Example Computing Environment

Figure 6A:
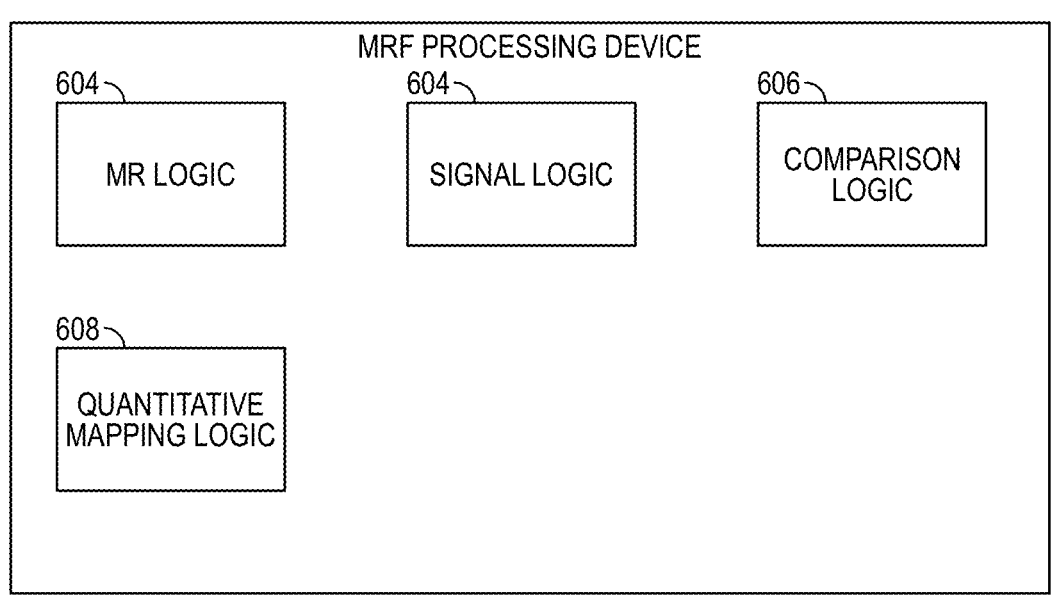
FIG. 6A illustrates an example MRF processing device in which the techniques of FIGS. 1-5C may be implemented, according to some aspects.

FIG. 6A depicts an exemplary MRF processing device 600 for analyzing MR images, and includes one or more logic modules 602, 604, 606, and/or 608. Depending on the implementation, the logic modules 602, 604, 606, and/or 608 may be implemented in the MRF processing device 600 as hardware, software, firmware, or some combination of such. MRF processing device 600 simultaneously quantifies MR parameters including T1, T2, proton density, and the apparent diffusion coefficient (ADC) for an object to which the MRF processing device 600 applies an MRF pulse sequence. In one aspect, MRF processing device 600 provides an MR image that facilitates identifying certain tissues based on their relative hypo-intense or hyper-intense appearance on an MR image (e.g., T1 weighted image, T2 weighted image).

MRF processing device 600 includes an MR logic module 602. The MR logic module 602 repetitively and variably samples an object in a (k, t, E) space to acquire a set of MR signals that may have non-constant amplitude and/or phase. For the (k, t, E) space, the k may be a point in k-space representing a spatial frequency of an MR image. In some implementations, the MR logic 602 may determine the value of k based on a Fourier Transform (FT) of the MR image. The t in the (k, t, E) space represents time, and the E represents one or more MR parameters for the MR image in question. Members of the set of MR signals are associated with different points in the (k, t, E) space. In different aspects, the different points are sampled according to a plan where t and/or E varies non-linearly and/or in a non-constant manner.

The MR logic module 602 may sample the object using a diffusion-weighted double-echo pulse sequence. In some aspects, the MR logic module 602 may employ a spiral readout. The pulse sequence may produce multiple signals per cycle of repetition time (TR). For example, both a free induction decay (FID) signal and an echo signal may be produced per TR. In some implementations, the FID signal is acquired using a variable density spiral-out trajectory and the spin echo signal is acquired using a variable density spiral-in trajectory. In further implementations, one signal may be more attuned with either of the T1 image or the T2 image. For example, the FID signal may be more T1-weighted and the echo signal may be more T2-weighted. In still further implementations, the MR logic module 602 may insert a mono-polar diffusion gradient between the FID and the spin echo. Inserting the mono-polar diffusion gradient may increase the diffusion sensitivity of the pulse sequence. In some aspects, the MR logic module 602 may acquire the FID and the spin echo with varying flip angles, varying repetition times, and varying diffusion gradient moments.

In some aspects, MRF processing device 600 also includes a signal logic module 604. Signal logic module 604 produces an MR signal evolution from the acquired MR signals. The signal evolution may include a number of MR signals acquired over a period of time. The set of MR signals may include transient-state signals associated with the MRF pulse sequence, a free induction decay signal, and a spin echo signal.

In further aspects, MRF processing device 600 also includes a comparison logic module 606. The comparison logic module 606 compares reference information with at least one of the produced MR signal evolution or information associated with the produced MR signal evolution. In some implementations, the comparison logic module 606 determines whether a match exists between signals included in the reference information and at least one of the produced MR signal evolution or information associated with the produced MR signal evolution based on whether the comparison logic module 606 determines there to be an exact match. In other implementations, an exact match is not necessary, and the comparison logic module 606 may determine that there exists a match where signals are similar. Depending on the implementation, a match may be the signal that most closely matches another signal and/or the first signal that matches another signal to within a threshold. A match may be found by template matching, pattern matching, or other comparison approaches. The reference information may be, for example, a previously acquired signal evolution, a simulated signal evolution, an item derived from a signal evolution other than the produced MR signal evolution, and/or any other similar information. The reference information may include signal evolutions from different tissue types (e.g., healthy, diseased, advanced disease, etc.).

In still further aspects, MRF processing device 600 also includes a quantitative mapping logic module 608. Quantitative mapping logic module 608 simultaneously produces quantitative maps for T1, T2, proton density, and diffusion associated with the object being scanned, based at least in part on the stored signal evolution that matches the MR signal evolution. The MR parameters may be retrieved from a data store that links stored MR parameters to the reference information. Quantitative mapping logic module 608 may also display the quantitative maps or cause the quantitative maps to be displayed.

While comparison logic module 606 and quantitative logic module 608 are illustrated as being part of MRF processing device 600, in some aspects, the comparison logic module 606 and quantitative mapping logic module 608 may reside in an apparatus separate from the MRF processing device 600. In such aspects, MRF processing device 600 may provide MR signals to the separate apparatus housing comparison logic module 606 or quantitative mapping logic module 608. In further aspects, comparison logic module 606 and/or quantitative mapping logic module 608 may reside in separate apparatuses.

Figure 6B:
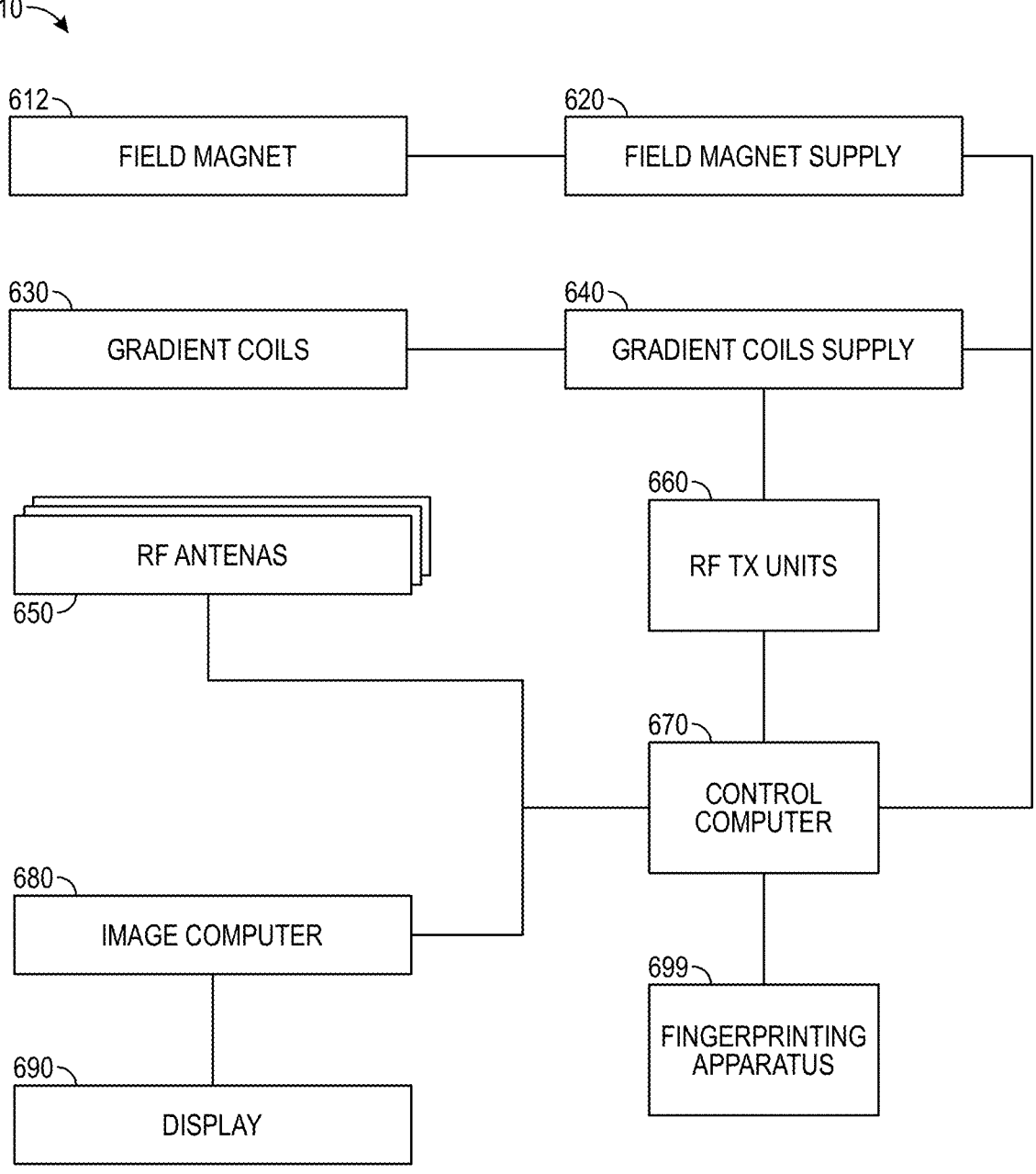
FIG. 6B illustrates an example MRF system which may include the MRF processing device of FIG. 6A and in which the techniques of FIGS. 1-5C may be implemented, according to some aspects.

FIG. 6B depicts an exemplar MR system 610 configured with a fingerprinting apparatus 699 to facilitate MR fingerprinting. Depending on the implementation, the fingerprinting apparatus 699 is and/or includes elements of MRF processing device 600 as described with regard to FIG. 6A above. In further implementations, the fingerprinting apparatus 699 performs example methods as described above. While fingerprinting apparatus 699 is illustrated as part of MRF system 610 in one example, fingerprinting apparatus 699 may be a separate apparatus or apparatuses.

The system 610 includes one or more field magnets 612 and a field magnet supply 620. In some implementations, the field magnets 612 produce a uniform B_0 field—i.e. the main static magnetic field of the MRF system 610. However, in other implementations, the B_0 field is not uniform. In such implementations, the magnetic field instead varies over an object that the MRF system 610 analyzes. MRF system 610 further includes gradient coils 630 configured to emit gradient magnetic fields. The gradient coils 630 may be controlled, at least in part, by a gradient coil supply 640. In some implementations, the timing, strength, and orientation of the gradient magnetic fields may be controlled, and thus selectively adapted, during an MR procedure. As described above, the gradient coils 630 may commonly correlate signals with each other. As such, in some implementations, the system 610 may mistake noise from multiple coils as being an actual signal, resulting in skewed denoising. In such implementations, to counter such correlation, the system 610 performs a decorrelation procedure. The decorrelation procedure may be a pre-whitening procedure, an extraction procedure, or any other similar procedure as known in the art.

In some implementations, MRF system 610 includes a set of RF antennas 650 that generate RF pulses and receive resulting MR signals from an object that the MRF system 610 scans—i.e. the object to which the RF antennas 650 direct the RF pulses. In further implementations, the MRF system 610 controls how the pulses are generated and how the resulting MR signals are received. As such, the MRF system 610 may selectively adapt both operations during an MR procedure. In some implementations, the RF antennas 650 employs separate RF transmission and reception coils. Similarly, the RF antennas 650 may be controlled at least in part by a set of RF transmission units 660.

In some implementations, a control computer 670 controls some or all of the field magnet supply 620, the gradient coils supply 640, and/or the RF transmission units 660. In further implementations, the control computer 670 is further programmed to control an MR device such as MRF processing device 600. In other implementations, control computer 670 is or includes elements of MRF processing device 600. Conventionally, the MRF system 610 employs the MR signals received from the RF antennas 650 to generate an MRF image, and thus may be subject to a transformation process. In some implementations, the transformation process is or is akin to a two dimensional fast Fourier transform (FFT) that generates pixilated image data. Depending on the implementation an image computer 680 may perform the transformation. In other implementations, another, similar processing device performs the image transformation. Depending on the implementation, the display 690 may then display the image data. In some implementations, the display 690 may display plots. For example, the display 690 may display the plot of eigenvalues 115 and the combined plot 120 plotting the noise eigenvalues 122, the signal eigenvalues 124, and the general noise model 123.

Fingerprinting apparatus 699 facilitates the unconventional techniques for MR image reconstruction and denoising as described herein. Further, the fingerprinting apparatus 699 facilitates the construction of images from MR signals received from the RF antennas 650. As such, the RF energy applied to an object by system 610 need not be constrained to produce signals with substantially constant amplitudes or phases. Instead, fingerprinting apparatus 699 facilitates matching received signals to known signals for which a reconstruction parameter, relaxation parameter, or other information is already available.

While FIG. 6B illustrates an example MRF system 610 that includes various components connected in various ways, one of ordinary skill in the art will appreciate that other MR systems may include other components connected in other ways.

Example Machine Learning Computing

Either of the control computer 670 and/or the image computer 680 (and/or another computer, not depicted) may perform machine learning training and operation functions. Specifically, a computer such as a server, laptop, mobile device, wearable device etc. may include a non-transitory memory including computer-executable instructions that, when executed, cause the computer to operate the reconstruction artificial neural network component 102, including the fingerprint generator 104a, the image reconstruction network 104b and/or the parameter estimation network 104c.

In general, a computer program or computer based product, application, or code (e.g., the model(s), such as machine learning models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by processor(s), such as the processors of the control computer 670, working in connection with an operating system in memory to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

For example, in some aspects, the memory of the control computer 670 includes a ML model training module, comprising a set of computer-executable instructions implementing machine learning training, configuration, parameterization and/or storage functionality. The ML model training module may initialize, train and/or store one or more ML models, as discussed herein. The trained ML models may be stored. The ML training module may train one or more ML models (e.g., an artificial neural network). One or more training data sets may be used for model training in the present techniques, as discussed herein. The input data may have a particular shape that may affect the ANN network architecture. The elements of the training data set may comprise tensors scaled to small values (e.g., in the range of (−1.0, 1.0)). In some aspects, a preprocessing layer may be included in training (and operation) which applies principal component analysis (PCA) or another technique to the input data. PCA or another dimensionality reduction technique may be applied during training to reduce dimensionality from a high number to a relatively smaller number. Reducing dimensionality may result in a substantial reduction in computational resources (e.g., memory and CPU cycles) required to train and/or analyze the input data.

In general, training an ANN may include establishing a network architecture, or topology, adding layers including activation functions for each layer (e.g., a "leaky" rectified linear unit (ReLU), softmax, hyperbolic tangent, etc.), loss function, and optimizer. In an aspect, the ANN may use different activation functions at each layer, or as between hidden layers and the output layer. A suitable optimizer may include Adam and Nadam optimizers. In an aspect, a different neural network type may be chosen (e.g., a recurrent neural network, a deep learning neural network, a convolutional neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the artificial neural network may be encoded in an N-dimensional tensor, array, matrix, and/or other suitable data structure. In some aspects, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one or more gradient descent algorithms, to reduce loss and to cause the values output by the network to converge to expected, or "learned", values. In an aspect, a regression may be used which has no activation function. Therein, input data may be normalized by mean centering, and a mean squared error loss function may be used, in addition to mean absolute error, to determine the appropriate loss as well as to quantify the accuracy of the outputs.

For example, the ML training module may receive labeled data at an input layer of a model having a networked layer architecture (e.g., an artificial neural network, a convolutional neural network, a deep neural network, etc.) for training the one or more ML models to generate ML models (e.g., the fingerprint generator 104*a*). The received data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. The method may include training a respective output layer of the one or more machine learning models. The output layer may be trained to output a prediction, for example.

Training data may include heterogeneous data (e.g., textual data, image data, audio data, etc.). As discussed, in some aspects, multiple ANNs may be separately trained and/or operated. In some aspects, the present techniques may include using a machine learning framework (e.g., Keras, scikit-learn, etc.) to facilitate the training and/or operation of machine learning models.

In various aspects, one or more ML models, as described herein, may be trained using a supervised and/or unsupervised machine learning program or algorithm. The machine learning program or algorithm may employ a neural network, which may be a convolutional neural network, a deep learning neural network, and/or a combined learning module or program that learns in two or more features or feature datasets (e.g., structured data, unstructured data, etc.) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be based on, or otherwise incorporate aspects of one or more machine learning algorithms included as a library or package executed on the control computer 670. For example, libraries may include the TensorFlow based library, the Pytorch library, and/or the scikit-learn Python library.

Machine learning may involve identifying and recognizing patterns in existing data (such as data risk issues, data quality issues, sensitive data, etc.) in order to facilitate making predictions, classifications, and/or identifications for subsequent data (such as using the models to determine or generate a classification or prediction for, or associated with, applying a data governance engine to train a descriptive analytics model).

Machine learning model(s), may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised or self-supervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. In the present techniques, unsupervised learning may be used, inter alia, for purposes of training the image reconstruction network 104*b* and parameter estimation network 104*c* to perform MRF reconstruction.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques. In various aspects, training the ML models herein may include generating an ensemble model comprising multiple models or sub-models, comprising models trained by the same and/or different AI algorithms, as described herein, and that are configured to operate together.

Example Accelerated Cardiac MRF Acquisitions

As stated, one of the advantages of the present techniques over conventional techniques is accelerating cardiac MRF acquisitions. For example, in one subject, an accelerated scan was retrospectively simulated by only reconstructing data collected during the first 5 heartbeats and the first 150 ms of each ECG acquisition window. This corresponds to a 67% reduction in breath hold duration (from 15 to 5 heartbeats) and a 42% reduction in acquisition window length (from 255 to 150 ms); overall, the total number of MRF images (TRs) was reduced from 750 to 145 TRs. In some aspects, the present techniques may include a modified U-net where the top-most skip connection (the arrow at the top of FIG. 2B) was removed. This modified network improves noise suppression while still preserving important high-resolution features, such as the papillary muscles. The T1 and T2 values for the accelerated scan using the self-supervised network (T1 1098.0+/−60 ms, T2 44.9+/−3.6 ms) are in good agreement with the values obtained for the un-accelerated scan using dictionary matching (T1 1078.3+/−47.2 ms, T2 43.9+/−3.4 ms).

The present techniques include reconstructing cardiac MRF T1 and T2 maps using a self-supervised deep neural network that does not require additional training data or a dictionary. These techniques include using the structure of a deep convolutional neural network combined with a physical model of the image acquisition process to reconstruct an image. The present techniques demonstrate the feasibility of this approach in MRF scans of healthy subjects. Enabling accelerated MRF scans with both a shortened breath hold and a shortened ECG acquisition window advantageously improve upon conventional techniques, particularly for patients who have difficulty performing breath holds or who have elevated heart rates.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A computing system for self-training of a magnetic resonance imaging (MRI) tissue property artificial neural network (ANN), comprising:

one or more processors;

an ANN training application including computing instructions configured to be executed by the one or more processors;

a tissue property generation ANN, electronically accessible by the ANN training application;

a trained magnetic resonance fingerprint generator ANN, electronically accessible by the ANN training application; and an MRI physics model, electronically accessible by the ANN training application;

wherein the tissue property generation ANN:

i) includes a plurality of weights initialized using a matrix random values, ii) is configured to analyze acquired MRI inputs, and iii) is configured to output quantitative tissue property maps corresponding to the acquired MRI inputs;

wherein the trained magnetic resonance fingerprint generator ANN:

i) is pre-trained using input simulated data, ii) is configured to analyze input tissue property maps, and iii) is configured to output time series of MRI fingerprint images corresponding to the input tissue property maps; and wherein the computing instructions of the ANN training application, when executed by the one or more processors, are configured to cause the one or more processors to:

generate, by providing acquired MRI k-space data to the tissue property generation ANN, a plurality of tissue property maps;

generate, by providing the plurality of tissue property maps to the trained magnetic resonance fingerprint generator ANN, a time series of MRI fingerprint images;

generate, by providing the time series of MRI fingerprint images to the MRI physics model, reconstructed MRI k-space data; and compare the reconstructed MRI k-space data to the acquired MRI k-space data to minimize a self-consistency loss function.

2. The computing system of claim 1, wherein the tissue property generation ANN comprises:

i) an image reconstruction convolutional neural network that outputs reconstructed subspace images corresponding to the acquired MRI inputs; and ii) a fully-connected parameter estimation ANN that outputs the quantitative tissue property maps corresponding to the acquired MRI inputs.

3. The computing system of claim 1, wherein the time series of MRI fingerprint images includes cardiac MRI fingerprint images; and wherein one or both of i) the input tissue property maps and ii) the output tissue property maps include at least one of T1, T2, heart rate (RR interval durations) and proton density (M0).

4. The computing system of claim 3, wherein the ANN training application includes further computing instructions that, when executed by the one or more processors, are configured to cause the one or more processors to:

scale the time series of MRI fingerprint images by multiplying the MRI fingerprint images by M0 and by receiver coil sensitivity profiles.

5. The computing system of claim 1, wherein the tissue property generation ANN is trained using a self-consistency loss function.

6. The computing system of claim 1, further comprising:

wherein the ANN training application includes further computing instructions that, when executed by the one or more processors, are configured to cause the one or more processors to:

train the trained magnetic resonance fingerprint generator ANN using a Bloch equation simulation to generate a number of MRF signal time courses corresponding to a number of randomly generated cardiac rhythms.

7. The computing system of claim 1, wherein the acquired MRI K-space data is training data, and wherein the ANN training application includes further computing instructions that, when executed by the one or more processors, are configured to cause the one or more processors to:

cause the reconstructed MRI k-space data to be rendered as quantitative MRF tissue property maps in a computing device of a user.

8. A computer-implemented method for self-training of a magnetic resonance imaging (MRI) tissue property artificial neural network (ANN), the method comprising:

generating, by providing acquired MRI k-space data to a tissue property generation ANN, a plurality of tissue property maps;

generating, by providing the plurality of tissue property maps to a trained magnetic resonance fingerprint generator ANN, a time series of MRI fingerprint images;

training the magnetic resonance fingerprint generator ANN by processing a number of magnetic resonance fingerprinting signal time courses using a net magnetization equation to generate the number of MRI fingerprinting signal time courses corresponding to a number of randomly generated cardiac rhythms;

generating, by providing the time series of MRI fingerprint images to an MRI physics model, reconstructed MRI k-space data; and comparing the reconstructed MRI k-space data to the acquired MRI k-space data to minimize a self-consistency loss function.

9. The computer-implemented method of claim 8, wherein the tissue property generation ANN comprises:

i) an image reconstruction convolutional neural network that outputs reconstructed subspace images corresponding to the acquired MRI inputs; and ii) a fully-connected parameter estimation ANN that outputs quantitative tissue property maps corresponding to the acquired MRI inputs.

10. The computer-implemented method of claim 8, wherein the time series of MRI fingerprint images includes cardiac MRI fingerprint images; and wherein the trained magnetic resonance fingerprint generator ANN is configured to analyze input tissue property maps and to output time series of MRI fingerprint images.

11. The computer-implemented method of claim 8, further comprising:

scaling the time series of MRI fingerprint images by multiplying the MRI fingerprint images by M0 and by receiver coil sensitivity profiles.

12. The computer-implemented method of claim 8, wherein the tissue property generation ANN is trained using a self-consistency loss function.

13. The computer-implemented method of claim 8, further comprising:

causing the reconstructed MRI k-space data to be rendered as quantitative MRF tissue property maps in a computing device of a user.

14. The computer-implemented method of claim 8, wherein training the magnetic resonance fingerprint generator ANN includes deriving the number of magnetic resonance fingerprinting signal time courses by simulating the evolution of the net magnetization during the scan, wherein the number of magnetic resonance fingerprinting signal time courses correspond to a respective number of randomly generated cardiac rhythms and a respective number of discrete MRI tissue property values.

15. A non-transitory computer-readable storage medium storing executable instructions that, when executed by a processor, cause a computer to:

generate, by providing acquired MRI k-space data to a tissue property generation ANN, a plurality of tissue property maps;

generate, by providing the plurality of tissue property maps to a trained magnetic resonance fingerprint generator ANN, a time series of MRI fingerprint images;

train the magnetic resonance fingerprint generator ANN by processing a number of magnetic resonance fingerprinting signal time courses using a net magnetization equation to generate the number of MRI fingerprinting signal time courses corresponding to a number of randomly generated cardiac rhythms;

generate, by providing the time series of MRI fingerprint images to an MRI physics model, reconstructed MRI k-space data; and compare the reconstructed MRI k-space data to the acquired MRI k-space data to minimize a self-consistency loss function.

16. The non-transitory computer-readable storage medium of claim 15, wherein the tissue property generation ANN comprises:

i) an image reconstruction convolutional neural network that outputs reconstructed subspace images corresponding to the acquired MRI inputs; and ii) a fully-connected parameter estimation ANN that outputs quantitative tissue property maps corresponding to the acquired MRI inputs.

17. The non-transitory computer-readable storage medium of claim 15, storing further executable instructions that, when executed, cause a computer to:

scale the time series of MRI fingerprint images by multiplying the MRI fingerprint images by M0 and by receiver coil sensitivity profiles.

18. The non-transitory computer-readable storage medium of claim 15, wherein the tissue property generation ANN is trained using a self-consistency loss function.

19. The non-transitory computer-readable storage medium of claim 15, storing further executable instructions that, when executed, cause a computer to:

cause the reconstructed MRI k-space data to be rendered as quantitative MRF tissue property maps in a computing device of a user.

* * * * *